(12) United States Patent
Takeuchi et al.

(10) Patent No.: US 8,930,085 B2
(45) Date of Patent: Jan. 6, 2015

(54) CONTROL SYSTEM FOR VEHICLE

(75) Inventors: Keisuke Takeuchi, Susono (JP); Toshio Tanahashi, Susono (JP); Shinichi Sano, Toyota (JP); Yoshimitsu Agata, Susono (JP); Toshihiro Yamazaki, Toyota (JP); Shin Noumura, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 708 days.

(21) Appl. No.: 13/223,976

(22) Filed: Sep. 1, 2011

(65) Prior Publication Data

US 2012/0062375 A1 Mar. 15, 2012

(30) Foreign Application Priority Data

Sep. 15, 2010 (JP) ................................. 2010-207209

(51) Int. Cl.
  *B60T 8/30* (2006.01)
  *B60W 50/08* (2012.01)
  *B60W 50/14* (2012.01)
(52) U.S. Cl.
  CPC .............. *B60W 50/085* (2013.01); *B60W 50/14* (2013.01); *B60W 2520/105* (2013.01); *B60W 2520/125* (2013.01)
  USPC .................. 701/48; 701/70; 701/41; 340/441; 340/467
(58) Field of Classification Search
  CPC . B60W 30/182; B60W 50/085; B60W 50/10; B60W 50/14; B60W 50/16; B60W 2520/105; B60W 2520/125; B60W 2540/10; B60W 2540/30; B60W 40/08; B60W 40/09; B60G 2800/24; B62D 6/008

USPC ............. 701/1, 36, 37, 40, 41, 44, 48, 49, 70; 340/441, 438, 467
See application file for complete search history.

(56) References Cited

U.S. PATENT DOCUMENTS

| 5,717,591 | A | | 2/1998 | Okada et al. | |
| 5,734,726 | A | * | 3/1998 | Truchsess | 381/61 |
| 6,859,539 | B1 | * | 2/2005 | Maeda | 381/86 |
| 7,815,313 | B2 | * | 10/2010 | Ito et al. | 353/13 |
| 8,370,038 | B2 | * | 2/2013 | Ghoneim | 701/70 |
| 8,512,338 | B2 | * | 8/2013 | Rabiner et al. | 606/63 |
| 8,738,228 | B2 | * | 5/2014 | Filev et al. | 701/40 |

(Continued)

FOREIGN PATENT DOCUMENTS

| JP | A-2006-188132 | 7/2006 |
| JP | A-2007-106211 | 4/2007 |

(Continued)

*Primary Examiner* — Thomas G Black
*Assistant Examiner* — Ce Li
(74) *Attorney, Agent, or Firm* — Oliff PLC

(57) ABSTRACT

A control system for a vehicle, includes: a controller that is configured to obtain an index on the basis of a running condition of the vehicle, to vary a running characteristic of the vehicle on the basis of the index, and to vary details output from an effect producing device, which applies a stimulus to at least part of five senses of a driver of the vehicle, on the basis of the index, wherein when a variation in the running characteristic because of a variation in the index decreases, quickness of a behavior of the vehicle, the variation in the index in response to a variation in the running condition is relatively delayed, as compared with when the variation in the running characteristic because of the variation in the index increases quickness of the behavior of the vehicle.

8 Claims, 7 Drawing Sheets

(56) References Cited

U.S. PATENT DOCUMENTS

| | | | |
|---|---|---|---|
| 2004/0170288 A1* | 9/2004 | Maeda | 381/86 |
| 2004/0219981 A1* | 11/2004 | Bando | 463/35 |
| 2006/0022808 A1* | 2/2006 | Ito et al. | 340/425.5 |
| 2007/0030132 A1* | 2/2007 | Kobayashi et al. | 340/436 |
| 2007/0106447 A1* | 5/2007 | Ogawa | 701/96 |
| 2007/0112500 A1* | 5/2007 | Ogawa | 701/96 |
| 2009/0088918 A1* | 4/2009 | Takenaka et al. | 701/29 |
| 2009/0099727 A1* | 4/2009 | Ghoneim | 701/36 |
| 2010/0087288 A1* | 4/2010 | Yamamoto | 477/3 |
| 2010/0121549 A1* | 5/2010 | Fukuda et al. | 701/93 |
| 2010/0292904 A1* | 11/2010 | Taguchi et al. | 701/93 |
| 2012/0123665 A1* | 5/2012 | Greenberg et al. | 701/110 |
| 2012/0136506 A1* | 5/2012 | Takeuchi et al. | 701/1 |

FOREIGN PATENT DOCUMENTS

| | | |
|---|---|---|
| JP | A-2007-256841 | 10/2007 |
| JP | A-2008-25492 | 2/2008 |
| JP | 2008-025492 * | 7/2008 |
| JP | A-2008-176851 | 7/2008 |
| WO | WO 2011/021084 A2 | 2/2011 |
| WO | WO 2011/021088 A1 | 2/2011 |
| WO | WO 2011/021089 A2 | 2/2011 |
| WO | WO 2011/021090 A2 | 2/2011 |
| WO | WO 2011/021634 A1 | 2/2011 |

* cited by examiner

CONTROL SYSTEM FOR VEHICLE

INCORPORATION BY REFERENCE

The disclosure of Japanese Patent Application No. 2010-207209 filed on Sep. 15, 2010 including the specification, drawings and abstract is incorporated herein by reference in its entirety.

BACKGROUND OF THE INVENTION

1. Field of the Invention

The invention relates to a control system for a vehicle, which is configured to change the running characteristic of the vehicle.

2. Description of Related Art

The behavior of a vehicle, such as a vehicle speed and a running direction, varies depending on a driver's accelerating/decelerating operation or a driver's steering operation. The correlation between the operation amount and a variation in the behavior is determined not only on the basis of energy efficiency, such as a fuel consumption, but also on the basis of various characteristics, such as ride comfort, quietness and power performance required of the vehicle. Such a so-called running characteristic is set on the basis of a vehicle type, or the like, and is, for example, set by appropriately adjusting the characteristic of an engine output torque and gear shift against a driver's accelerator operation, the characteristic of braking force against a driver's brake operation, the characteristic of a steering mechanism against a driver's steering operation, the damping force characteristic of a shock absorber of a suspension mechanism, or the like.

The running characteristic set on the basis of a vehicle type, or the like, as described above is absolutely set so as to satisfy an assumed design condition. In contrast, there are various running environments in which vehicles run, such as urban areas, expressways, ascending roads and descending roads. In addition, there are various so-called driving orientations, such as preferences and tastes, in actual driver's driving, and a driving orientation may vary for each running environment. Therefore, in fact, the characteristic required of a vehicle varies for each driver or each running environment. Thus, in order to set the running characteristic of a vehicle, which exactly incorporates a driver's driving orientation, there is a need for bringing the driver's driving orientation into coincidence with the running characteristic of the vehicle as much as possible.

On the other hand, for example, there has been developed a technique that controls and outputs a sound effect, a display image, a pressure, vibrations, or the like, that acts on human's sense of sight, sense of hearing, sense of touch, or the like, to apply a stimulus on the basis of the running condition of the vehicle, such as the speed or acceleration of the vehicle and the output torque of the engine during running. An example of this configuration is described in Japanese Patent Application Publication No. 2008-25492 (JP-A-2008-25492). A vehicle control system described in JP-A-2008-25492 is configured so that a driver's operation amount by which operating means is operated at the time of generating an acceleration is detected, a transitional operation amount and an operating speed from a steady state of the operating means is computed on the basis of the operation amount, at least one of a target acceleration and a target sound pressure that increases by the amount of increase that exceeds a discrimination threshold for each period of time that a human is able to feel a received stimulus is computed on the basis of those computed transitional operation amount and operating speed and then at least one of a torque generating device that generate driving torque and an in-vehicle audio device that outputs engine sound is controlled on the basis of the at least one of the computed target acceleration and target sound pressure.

In addition, Japanese Patent Application Publication No. 2008-176851 (JP-A-2008-176851) describes a vehicle sound effect generating device that generates a sound effect on the basis of sound source information formed of information about the running condition of a vehicle or the operating state of an engine. The device described in JP-A-2008-176851 is configured so that a control signal for generating a sound effect is generated on the basis of the sound source information and is output as a sound effect, a running environment signal that indicates the running environment of the vehicle is generated and the output characteristic of the control signal is varied on the basis of the running environment signal. In addition, JP-A-2008-176851 particularly describes the device that is configured to vary the output characteristic of a control signal for generating a sound effect on the basis of the acceleration of the vehicle.

In addition, Japanese Patent Application Publication No. 2007-256841 (JP-A-2007-256841) describes an in-vehicle acceleration display device that is configured so that the acceleration of a vehicle is detected to output an acceleration detection signal, a display control signal for graphically displaying the acceleration of the vehicle in a mode based on its variation on the basis of the acceleration detection signal is output and then the acceleration of the vehicle is graphically displayed on the basis of the display control signal.

Then, Japanese Patent Application Publication No. 2006-188132 (JP-A-2006-188132) describes a driving information transmitting device that transmits information about the accelerating/decelerating state of a vehicle to a driver through the sense of touch. The driving information transmitting device includes means for applying a first pressure stimulus to at least part of the area from the back to the buttocks of a driver's body seated on a driver seat from the vehicle rear side to the front side and means for applying a second pressure stimulus to at least part of the thighs of the driver's body seated on the driver seat from the lower side to the upper side. The driving information transmitting device is configured to apply the first pressure stimulus to the driver when the acceleration of the vehicle is detected, and to apply the second pressure stimulus to the driver when the deceleration of the vehicle is detected.

Note that JP-A-2006-188132 describes a music selection and playing method that, for example, incorporates the condition of a host vehicle, the surrounding condition of the host vehicle and the condition of a passenger, such as a season, weather, weekday, the time of day, a vehicle speed and a destination, to score and rank a plurality of pieces of music data, and then the ranked music data are sequentially transmitted to an audio device in the descending order and are played.

The above descried publications, for example, describe the audio device that generates engine sound or a sound effect, the display device that graphically displays a variation in acceleration or a pressurizing/vibrating device that generates a pressure or vibrations for applying a stimulus to a driver are controlled on the basis of the acceleration (or deceleration) of the vehicle. In other words, the above descried publications describe that a so-called effect producing device that outputs a so-called produced effect, such as sound, light, image, pressure and vibrations, which applies a stimulus to a human's sense, such as the sense of hearing, the sense of sight and the sense of touch, is controlled on the basis of the acceleration of the vehicle.

Here, the acceleration of a vehicle varies in response to a driver's driving operation, such as an accelerator operation, a brake operation and a steering operation, and, in addition, such a driver's driving operation is conducted because of various factors. Furthermore, the acceleration of the vehicle may occur or the acceleration of the vehicle may vary depending on a road condition, a running environment, or the like, on which the vehicle runs. That is, the acceleration of the vehicle occurs or varies depending on various factors or conditions.

Thus, as in the case of the devices described in these publications, when the above described so-called effect producing device is controlled simply on the basis of the acceleration of a vehicle, there is still room for improvement in order to bring the produced effect output by the effect producing device into coincidence with the image or taste of the driver, that is, in order to execute control by appropriately incorporating a driver's driving orientation into the details output from the above effect producing device. In addition, similarly, when the above described running characteristic of the vehicle, such as a power characteristic, a steering characteristic and a suspension characteristic, is adapted to a driver's driving orientation as well, there is still room for improvement.

SUMMARY OF THE INVENTION

The invention provides a control system for a vehicle, which is able to bring a so-called running feel that is felt by driver's five senses, such as a feel experienced by a driver from the details of response in the case where an accelerating/decelerating operation, a steering operation, or the like, is conducted or a variation in the behavior of the vehicle resulting from a variation in running environment, such as entering an ascending road or a descending road, into coincidence with a driver's driving orientation or a running environment as much as possible.

A first aspect of the invention provides a control system for a vehicle. The control system for a vehicle, includes: a controller that is configured to obtain an index on the basis of a running condition of the vehicle, to vary a running characteristic of the vehicle on the basis of the index, and to vary details output from an effect producing device, which applies a stimulus to at least part of five senses of a driver of the vehicle, on the basis of the index, wherein when a variation in the running characteristic because of a variation in the index decreases quickness of a behavior of the vehicle, the variation in the index in response to a variation in the running condition is relatively delayed, as compared with when the variation in the running characteristic because of the variation in the index increases quickness of the behavior of the vehicle.

The vehicle may include at least any one of an accelerating operation mechanism, a decelerating operation mechanism and a steering mechanism, and the controller may be configured to vary a degree of variation in behavior resulting from operating the at least any one of the mechanisms, as the details output from the effect producing device, on the basis of the index.

The vehicle may include at least any one of an accelerating operation mechanism, a decelerating operation mechanism and a steering mechanism, and the controller may be configured to vary reaction force against operating force in the case where the driver operates the at least any one of the mechanisms, as the details output from the effect producing device, on the basis of the index.

The effect producing device may include a sound generating device that generates sound, and the controller may be configured to vary a sound pressure of the sound generating device on the basis of the index.

The sound generating device may be configured to generate sound having a frequency corresponding to a speed of the vehicle.

The controller may be configured to execute smoothing such that a control signal for the sound generating device becomes smoother than a control signal for an actuator that varies the running characteristic.

The index may be obtained from a resultant acceleration based on a longitudinal acceleration and lateral acceleration of the vehicle.

A second aspect of the invention provides a control system for a vehicle. The control system for a vehicle, includes a controller that is configured to vary details output from an effect producing device, which applies a stimulus to at least part of five senses of a driver of the vehicle, on the basis of an index obtained from a resultant acceleration based on a longitudinal acceleration and lateral acceleration of the vehicle.

With the above configurations, an index is obtained on the basis of the running condition of the vehicle. The index is an index such that a variation that increases quickness of the behavior of the vehicle occurs quickly in response to a variation in the running condition, while, on the other hand, a variation that decreases quickness of the behavior of the vehicle occurs with a delay from a variation in the running condition. The details output from the effect producing device are varied on the basis of the index. The effect producing device may include a device that outputs a stimulus that may be experienced by at least part of the five senses of a driver, such as an accelerating feel, a braking feel and a quick turning feel that are experienced by the driver through a variation in the running characteristic and the quality and intensity of sound, the luminance and tone of a decoration panel in a vehicle cabin, and the like, resulting from those variations in behavior. Thus, the running characteristic, such as an accelerating feel and quickness of steering, a running feel experienced by the driver accordingly and a feel obtained by the sense of sight, the sense of hearing, or the like, coincides with driver's expectation or assumption to thereby make it possible to improve drivability. In addition, the running condition and running environment at that point in time, the taste of the driver, and the like, may be appropriately incorporated, so it is possible to give comfort driving feeling and driving pleasure to the driver or to appropriately cause a passenger or a human outside the vehicle to pay attention.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
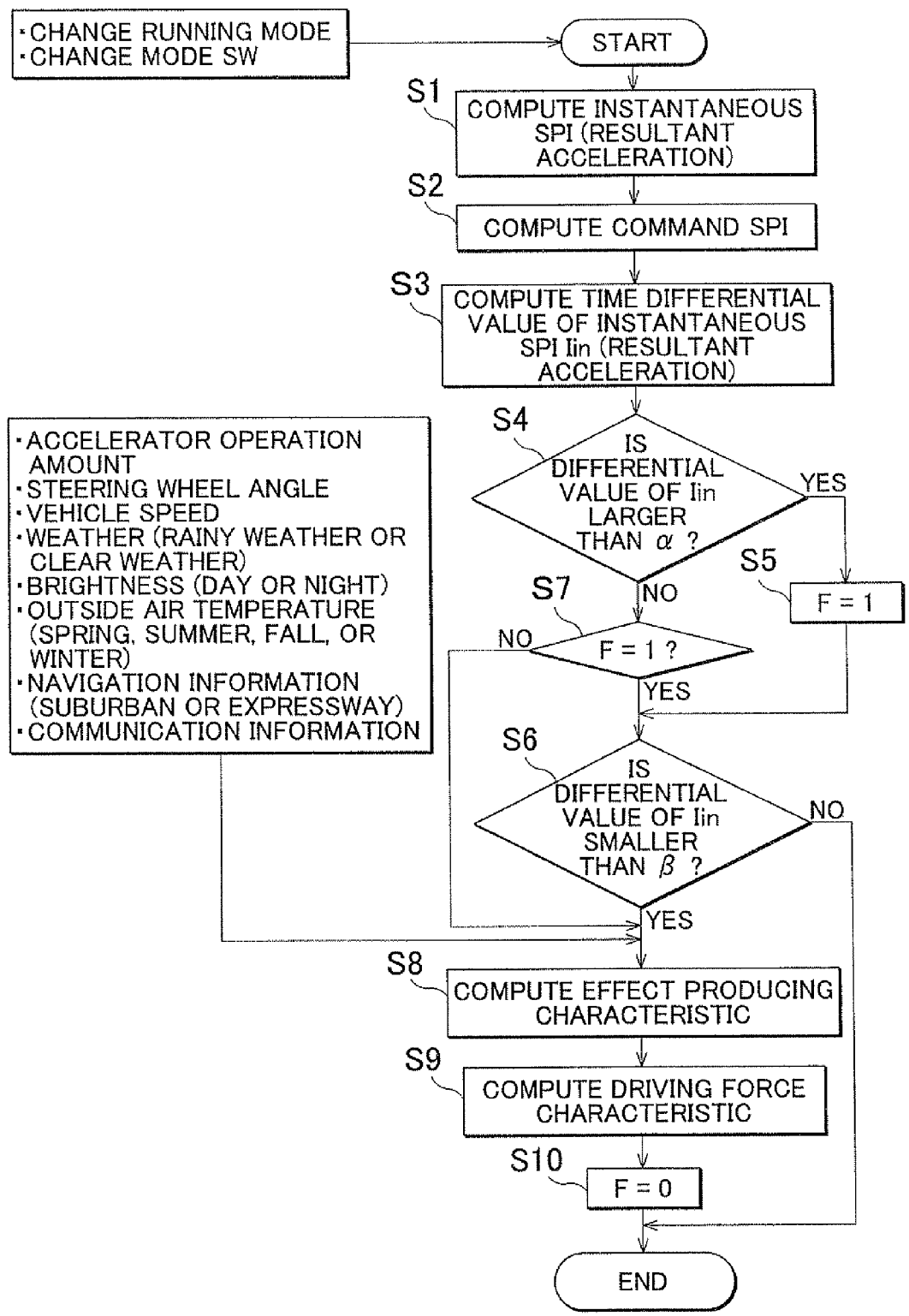
FIG. 1 is a flowchart for illustrating a specific example of control executed by a control system according to an embodiment of the invention.

Hereinafter, the aspect of the invention will be specifically described. A vehicle to which a control system according to an embodiment of the invention is applied is a general vehicle that is configured so that the vehicle transmits torque, output from a step-shift or continuously variable transmission coupled to the output side of a driving force source, such as an engine and a motor, to drive wheels to run and steers front wheels using a steering mechanism to turn and, in addition, brakes are respectively arranged at the wheels and a vehicle body is supported by a suspension mechanism. The control system according to the embodiment of the invention is configured to change the details of control over driving force produced by the engine and the transmission, the details of control over steering made by the steering mechanism, the details of control over braking made by the brakes and the details of control over support of the vehicle body provided by the suspension mechanism on the basis of the running condition of the vehicle. These engine and transmission and the above mechanisms operate so as to vary the behavior of the vehicle. That is, the control system according to the embodiment of the invention is configured to change the running characteristic of the vehicle on the basis of the running condition of the vehicle. The running characteristic includes a driving force characteristic provided by the driving force source, the transmission and the brakes, a steering characteristic, turning characteristic and power assist characteristic provided by the steering mechanism, a suspension characteristic and damper characteristic provided by the suspension mechanism, and the like. In the following description, the "running characteristic" may collectively mean these characteristics.

In addition, the control system according to the embodiment of the invention includes an effect producing device that appropriately sets a stimulus experienced by driver's five senses. The stimulus includes longitudinal and transverse inertial force resulting from a variation in the behavior of the vehicle, a vertical load transmitted through the suspension mechanism, and the like. Then, details output from the effect producing device are configured to be controlled on the basis of the running condition of the vehicle. Here, a produced effect is, for example, an effect that acts on a human's sense, such as the sense of hearing, the sense of sight, the sense of touch, the sense of smell and the sense of taste, to apply a stimulus, and is, specifically, a sound effect that acts on the sense of hearing of a human, such as sound, music, artificial sound and alarm sound, a display that acts on the sense of sight of a human, such as light, illumination, image, video and alarm lamp, and a stimulus factor that acts on the sense of touch, such as pressure, vibrations, heat and reaction force against an accelerating operation, steering, or the like. Thus, the effect producing device according to the embodiment of the invention includes a sound effect generating device or audio device that outputs the above described sound effect, a display device that displays light, image, or the like, a pressure and vibration generating device that generates pressure or vibrations, and the like. These various devices are collectively termed the effect producing device.

Then, the control system according to the embodiment of the invention obtains an index or parameter from a running condition. The running condition includes a longitudinal or lateral acceleration component, a resultant acceleration that combines these longitudinal and lateral acceleration components, an accelerator operation amount, a brake operation amount, the degree of yawing, a yaw rate, and the like. In addition, the acceleration includes an actual acceleration detected by a sensor and an estimated acceleration calculated from an accelerator operation amount or a brake operation amount. A specific example described below is an example that uses a parameter obtained from an acceleration.

Figure 5:
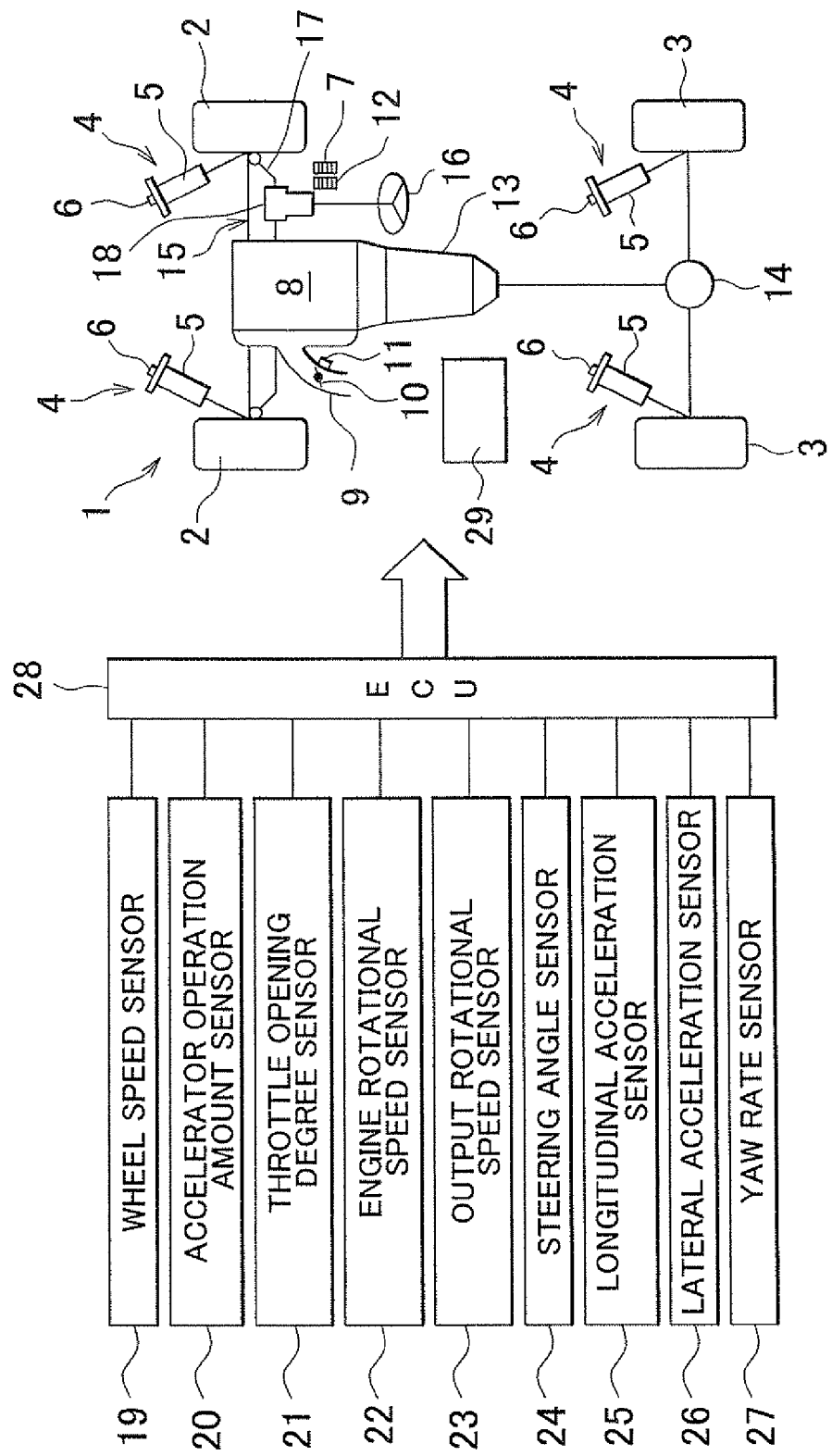
FIG. 5 is a view that schematically shows a vehicle to be controlled according to the embodiment of the invention.

First, an example of a vehicle to be controlled according to the embodiment of the invention will be described. In the embodiment of the invention, a vehicle subjected to control accelerates, decelerates or turns by driver's operation. A typical example of the vehicle is an automobile that uses an internal combustion engine or a motor as a driving force source. FIG. 5 is a block diagram that shows one example of the vehicle. The vehicle 1 illustrated here accelerates, decelerates or turns by driver's operation. A typical example of the vehicle 1 is an automobile that uses an internal combustion engine or a motor as a driving force source. That is, the vehicle 1 includes four wheels consisting of two steered front wheels 2 and two driving rear wheels 3. Each of these four wheels 2 and 3 is assembled to a vehicle body (not shown) by a suspension device 4. Each suspension device 4, as well as a generally known suspension device, is principally formed of a spring and a shock absorber (damper). FIG. 5 shows the shock absorbers 5. Each shock absorber 5 causes cushioning action using the flow resistance of a fluid, such as gas and liquid, and is able to change the flow resistance by an actuator, such as a motor 6. When the flow resistance of each shock absorber 5 is increased, the vehicle body is hard to squat down and provides a so-called stiff characteristic, and the behavior of the vehicle becomes less comfortable and provides an increased sporty feel. Note that the vehicle 1 may be configured to adjust the vehicle height by supplying or drawing pressurized gas to or from these shock absorbers 5.

Brake devices (not shown) are provided for the respective front and rear wheels 2 and 3. The brake devices are operable to apply braking force to the respective front and rear wheels 2 and 3 when a brake pedal 7 arranged at a driver seat is depressed.

The driving force source of the vehicle 1 is a generally known driving force source, such as an internal combustion engine, a motor and a combination of them. FIG. 5 shows an example of the vehicle 1 equipped with an internal combustion engine (engine) 8. A throttle valve 10 for controlling an intake air flow rate is arranged in an intake pipe 9 of the engine 8. The throttle valve 10 is an electronic throttle valve. The throttle valve 10 is, for example, opened or closed by an electrically controlled actuator 11, such as a motor, to thereby adjust the opening degree. Then, the actuator 11 operates in accordance with a depression amount of an accelerator pedal 12 arranged at the driver seat, that is, an accelerator operation amount, to thereby adjust the throttle valve 10 to a predetermined opening degree (throttle opening degree).

The correlation between an accelerator operation amount and a throttle opening degree may be appropriately set. As the correlation between an accelerator operation amount and a throttle opening degree approaches a one-to-one correlation, the driver more strongly experiences a so-called direct feel and, therefore, the running characteristic of the vehicle becomes a sporty characteristic. In contrast, when the characteristic is set so that the throttle opening degree becomes relatively low against the accelerator operation amount, the running characteristic of the vehicle becomes a so-called mild characteristic. When the motor is used as a driving force source, a current controller, such as an inverter and a converter, is provided instead of the throttle valve 10. Then, the current controller is configured to adjust supplied current in accordance with an accelerator operation amount and to appropriately change the correlation of a current value with respect to an accelerator operation amount, that is, the running characteristic.

A transmission 13 is coupled to an output side of the engine 8. The transmission 13 is configured to appropriately change the ratio between an input rotational speed and an output rotational speed, that is, a speed ratio. The transmission 13 is, for example, a generally known transmission, such as a step-gear automatic transmission, a belt-type continuously variable transmission and a toroidal-type continuously variable transmission. The transmission 13 includes an actuator (not shown). The transmission 13 is configured to change the speed ratio in a stepwise manner or continuously by appropriately controlling the actuator. Note that shift control over the transmission 13 is basically performed in order to set the speed ratio that provides high fuel efficiency. Specifically, a shift map that defines a speed ratio in correspondence with a state of the vehicle, such as a vehicle speed and an accelerator operation amount based on an accelerator operation by the driver, is prepared in advance, and shift control is executed in accordance with the shift map. Alternatively, a target output is calculated on the basis of a state of the vehicle, such as a vehicle speed and an accelerator operation amount, a target engine rotational speed is obtained on the basis of the target output and an optimal fuel efficiency line, and then shift control is executed so as to attain the target engine rotational speed.

The transmission 13 is configured so as to be able to select fuel efficiency priority control or driving force increasing control over the above described basic shift control. Fuel efficiency priority control is control for upshifting at a relatively low vehicle speed or control for using a relatively high-vehicle-speed-side speed ratio (low speed ratio) at a low vehicle speed. In addition, driving force increasing control or accelerating characteristic increasing control is control for upshifting at a relatively high vehicle speed or control for using a relatively low-vehicle-speed-side speed ratio (high speed ratio) at a high vehicle speed. These controls may be executed, for example, in such a manner that a shift map is changed, a drive request amount is corrected or a calculated speed ratio is corrected. Note that a transmission mechanism, such as a torque converter equipped with a lock-up clutch, may be provided between the engine 8 and the transmission 13 where necessary. Then, an output shaft of the transmission 13 is coupled to the rear wheels (drive wheels) 3 via a differential gear 14 that is a final reduction gear.

A steering mechanism 15 that steers the front wheels 2 will be described. The vehicle 1 includes a steering linkage 17 and an assist mechanism 18. The steering linkage 17 transmits the rotating motion of a steering wheel 16 to the right and left front wheels 2. The assist mechanism 18 assists the steering angle or steering force of the steering wheel 16. The assist mechanism 18 includes an actuator (not shown), and is able to adjust an assist amount assisted by the actuator. As the assist amount is reduced, the correlation between a steering force (or steering angle) and an actual turning force (or turning angle) of the front wheels 2 approaches a one-to-one correlation, and the driver experiences a so-called increased direct feel in steering, and the running characteristic of the vehicle becomes a so-called sporty characteristic. That is, the assist mechanism 18 is able to appropriately adjust the turning angle of the front wheels 2 against a steering angle and steering force.

Note that, although not specifically shown in the drawing, the vehicle 1 is equipped with an anti-lock brake system (ABS), a traction control system (TRC), a vehicle stability control system (VSC), and the like, for stabilizing the behavior or attitude. The vehicle stability control system (VSC) comprehensively controls these systems. These systems are generally known. These systems are configured to decrease braking force exerted on the wheels 2 and 3 or exert braking force on the wheels 2 and 3 on the basis of a deviation between a vehicle body speed and a wheel speed and, additionally, control engine torque at the same time, thus preventing or suppressing a lock or slip of the wheels 2 and 3 to stabilize the behavior of the vehicle. In addition, the vehicle may be provided with a navigation system that is able to obtain data in connection with a running road or a planned running road (that is, running environment) and/or a switch for manually selecting a running mode, such as a sporty mode, a normal mode and a low fuel consumption mode (eco mode). Furthermore, the vehicle may include a four wheel drive mechanism (4WD) that is able to change the running characteristic, such as hill-climbing characteristic, accelerating characteristic and a turning characteristic.

The vehicle 1 includes various sensors that acquire data for controlling the engine 8, the transmission 13, the shock absorbers 5 of the suspension devices 4, the assist mechanism 18, the above described systems (not shown), and the like. The sensors are, for example, a wheel speed sensor 19, an accelerator operation amount sensor 20, a throttle opening degree sensor 21, an engine rotational speed sensor 22, an output rotational speed sensor 23, a steering angle sensor 24, a longitudinal acceleration sensor 25, a lateral acceleration sensor 26, a yaw rate sensor 27, and the like. The wheel speed sensor 19 detects the rotational speed of each of the front and rear wheels 2 and 3. The output rotational speed sensor 23 detects the output rotational speed of the transmission 13. The longitudinal acceleration sensor 25 detects a longitudinal acceleration (Gx). The lateral acceleration sensor 26 detects the acceleration in the lateral direction (transverse direction) (lateral acceleration Gy).

Note that the acceleration sensors 25 and 26 may be shared with an acceleration sensor used in vehicle behavior control, such as the above anti-lock brake system (ABS) and vehicle stability control system (VSC), and, in the vehicle equipped with an airbag, the acceleration sensors 25 and 26 may be shared with an acceleration sensor provided for controlling deployment of the airbag. Furthermore, the longitudinal and lateral accelerations Gx and Gy may be obtained in such a manner that a value detected by an acceleration sensor inclined at a predetermined angle (for example, 45°) with respect to the longitudinal direction of the vehicle along a horizontal plane is decomposed into a longitudinal acceleration and a lateral acceleration. Furthermore, instead of detecting the longitudinal and lateral accelerations Gx and Gy by a sensor, the longitudinal and lateral accelerations Gx and Gy may be computed on the basis of an accelerator operation amount, a vehicle speed, a road load, a steering angle, and the like. These sensors 19 to 27 are configured to transmit detected signals (data) to an electronic control unit (ECU) 28. The electronic control unit 28 is configured to compute in accordance with those pieces of data and prestored data and programs and then output the computed results to the above described systems or the actuators of those systems as control command signals. Note that it is not limited to use the resultant acceleration; it may be an acceleration in any one direction, such as only in the vehicle longitudinal direction, may be used. In addition, not only a resultant acceleration but also an acceleration in any one direction, such as only in the vehicle longitudinal direction, may be used.

Then, the above various sensors 19 to 27 are configured to transmit detection signals (data) to an electronic control unit (ECU) 28. The electronic control unit 28 is configured to compute in accordance with those pieces of data and prestored data and programs and then output the computed results to the above described systems or the actuators of those systems as control command signals. Note that, in the embodiment of the invention, depression force on an accelerator pedal or a brake pedal (or reaction force at the time of depression) may be configured to be adjustable, and the depression force may be varied on the basis of the running condition including the above acceleration.

Furthermore, the vehicle to be controlled according to the embodiment of the invention is provided with an effect producing device 29 that adjusts or varies a stimulus applied to at least part of the five senses of a human. As described above, the effect producing device 29 outputs a so-called produced effect, such as sound, light, pressure and vibrations, that acts on a human's sense to apply a stimulus. The effect producing device 29 is, for example, an artificial engine sound generating device that artificially reproduces and outputs the intake/exhaust sound of the engine 8, a light display device that varies the displayed color or luminance of light, display area, or the like, on the basis of a vehicle speed, an acceleration or an engine rotational speed or a pressure/vibration generating device that causes a steering wheel, a seat, a seat belt, or the like, to generate vibrations, pressure or operation resistance force (reaction force) on the basis of a vehicle speed, an acceleration or an engine rotational speed. In addition, the effect producing device 29 may be configured to output a control signal that varies the running characteristic relevant to the behavior of the vehicle. Any two or more of the above described sound effect generating device, the light generating device, the pressure/vibration generating device, or the like, which serve as the effect producing devices 29 according to the embodiment of the invention, may be mounted on the vehicle at the same time. Alternatively, any one of the effect producing devices 29 may be mounted on the vehicle.

The control system according to the embodiment of the invention is configured to incorporate the running condition of the vehicle into control over the behavior of the vehicle (that is, control over the running characteristic). Here, the running condition of the vehicle is expressed by a longitudinal acceleration, a lateral acceleration, a yawing acceleration, a rolling acceleration or a resultant acceleration of some of these accelerations in the multiple directions. That is, when the vehicle is caused to run at a target speed or run in a target direction, or when the behavior of the vehicle, influenced by a running environment such as a road surface, is returned to an original state, accelerations in multiple directions usually occur. In consideration of this situation, a running environment or a driving orientation is conceivably incorporated in the running condition of the vehicle to some extent. On the basis of the above background, the control system according to the embodiment of the invention is configured to incorporate the running condition of the vehicle into control over the running characteristic of the vehicle.

As described above, the behavior of the vehicle includes an accelerating characteristic, a turning characteristic, a support stiffness of the suspension devices 4 (that is, the degree of bump/rebound and the tendency of occurrence of bump/rebound), the degree of rolling, the degree of pitching, and the like. The control system according to the embodiment of the invention changes these running condition on the basis of the above running condition. The running characteristic may be changed by using an acceleration in any one of the directions or a resultant acceleration, which is an example of the above running condition; however, in order to further reduce a sense of strangeness, an index obtained by correcting values that indicate the running condition may be used.

As an example of the index, a sportiness index (SPI) will be described. Here, the sportiness index is an index that indicates a driver's intention or a running condition of a vehicle. The sportiness index in this embodiment is an index obtained by combining accelerations in multiple directions (particularly, absolute values thereof). The sportiness index is, for example, an acceleration that combines the longitudinal acceleration Gx and the lateral acceleration Gy as an acceleration significantly associated with the behavior in the running direction. For example, an instantaneous sportiness index Jin is calculated by the mathematical expression (1). Here, the acceleration is not limited to an acceleration detected by a sensor; it may be computed or estimated on the basis of a driver's operation, such as an accelerator operation amount, a steering angle, a brake depression force and a depression amount of the brake pedal. In addition, the "instantaneous sportiness index Iin" means an index that is calculated on the basis of accelerations in the respective directions at an interval of each moment during running of the vehicle, and is a so-called physical quantity. Note that the "interval of each moment" means each time of repetition when detection of accelerations and calculation of an instantaneous sportiness index Iin based on the detected accelerations are repeatedly executed at a predetermined cycle time.

$$Iin=(Gx^2+Gy^2)^{1/2} \qquad (1)$$

In addition, within the longitudinal acceleration Gx used in the above mathematical expression (1), at least one of an accelerating acceleration (a positive acceleration) and a decelerating (braking) acceleration (a negative acceleration, that is, deceleration) is desirably normalized or weighted and then used. That is, in a general vehicle, the decelerating acceleration is larger than the accelerating acceleration; however, the difference is almost not experienced or recognized by the driver. In most cases, the driver recognizes that the accelerating and decelerating accelerations are almost equivalent to each other. Normalization is a process of correcting such a difference between an actual value and a feel experienced by the driver, and is a process of increasing the accelerating acceleration or decreasing the decelerating acceleration (that is, the deceleration) for the longitudinal acceleration Gx. More specifically, normalization is a process of obtaining the ratio between the maximum values of the respective accelerations and then multiplying the ratio by the accelerating or decelerating acceleration. Weighting is a process of correcting the decelerating acceleration for the lateral acceleration. In short, as in the case where longitudinal driving force and lateral force that can be generated in tires are represented by a tire friction circle, weighting is a correction process of, for example, weighting at least one of forward and rearward accelerations so that the maximum accelerations in the respective directions are placed on a circle of a predetermined radius. Through normalization and weighting, the degree of incorporation of the accelerating acceleration into the running characteristic is different from the degree of incorporation of the decelerating acceleration into the running characteristic. As one example of weighting, the decelerating acceleration and the accelerating acceleration are weighted so that, between the decelerating acceleration in the longitudinal direction of the vehicle and the accelerating acceleration in the longitudinal direction of the vehicle, the degree of influence of the accelerating acceleration is relatively larger than the degree of influence of the decelerating acceleration. Note that the lateral acceleration may be larger than the accelerating acceleration, so the lateral acceleration may also be subjected to normalization or weighting, as described above.

In this way, an actual acceleration and a feel experienced by the driver are different from each other depending on the direction of the acceleration. For example, there is conceivably such a difference between an actual acceleration and a feel experienced by the driver in an acceleration in the yawing direction, an acceleration in the rolling direction and a longitudinal acceleration. Then, in the embodiment of the invention, the control system is able to vary the degree of incorporation of each of accelerations in different directions into the running characteristic. In other words, the control system is able to vary the degree of a change in running characteristic based on an acceleration in any one of the directions from the degree of a change in running characteristic based on an acceleration in another direction.

Figure 6:
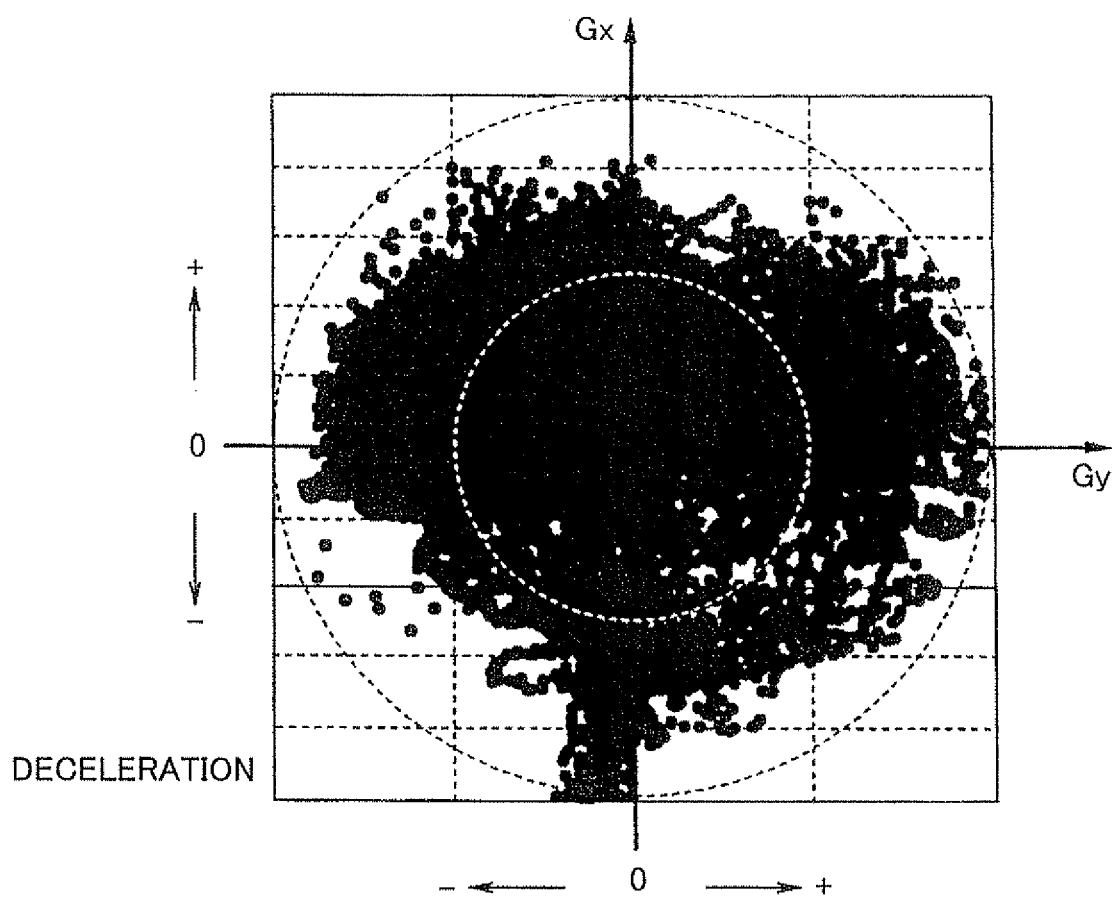
FIG. 6 is a graph that shows detected longitudinal accelerations and detected lateral accelerations that are plotted on a tire friction circle.

FIG. 6 shows an example of a tire friction circle on which the lateral accelerations Gy detected by the sensor and the normalized longitudinal accelerations Gx are plotted. This is an example when a vehicle runs on a test course that simulates an ordinary road. It appears that the frequency of an increase in lateral acceleration Gy is high when the vehicle significantly decelerates; however, both the longitudinal acceleration Gx and the lateral acceleration Gy generally tend to occur along the tire friction circle.

Figure 7:
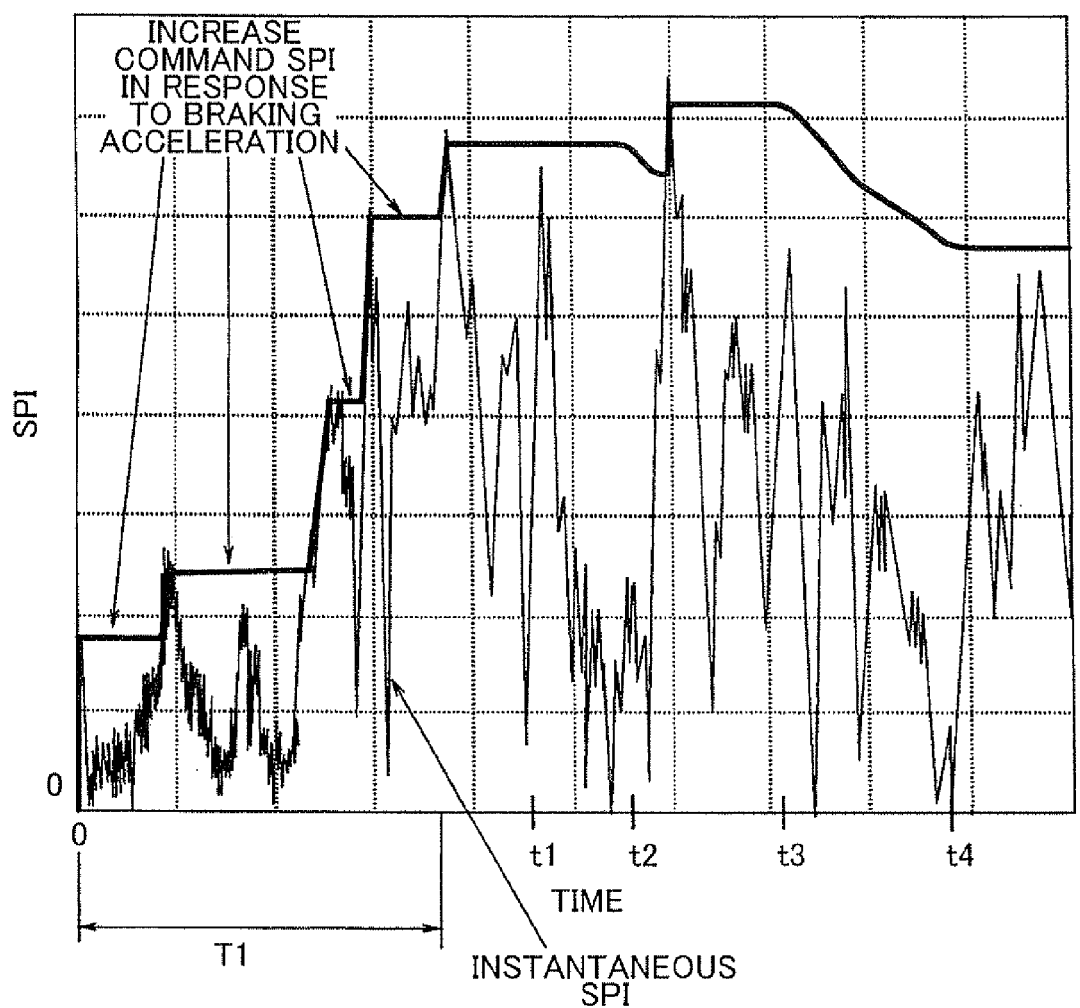
FIG. 7 is a graph that shows an example of a variation in a command sportiness index based on an instantaneous sportiness index.

In the embodiment of the invention, a command sportiness index Iout is obtained from the above described instantaneous sportiness index Iin. The command sportiness index Iout is an index used in control for changing the running characteristic, and is configured to immediately increase with an increase in instantaneous sportiness index Iin that is a base for calculating the command sportiness index Iout and to contrarily decrease with a delay from a decrease in instantaneous sportiness index Iin (that is, resultant acceleration). Particularly, the command sportiness index Iout is configured to decrease when a predetermined condition is satisfied. FIG. 7 shows a variation in command sportiness index Iout obtained on the basis of a variation in instantaneous sportiness index Iin. In the example shown here, the instantaneous sportiness index Iin is indicated by values plotted in FIG. 6. On the other hand, the command sportiness index Iout is set at a local maximum value of the instantaneous sportiness index Iin and is kept at the last value until a predetermined condition is satisfied. That is, the command sportiness index Iout is an index that quickly increases and relatively slowly decreases.

More specifically, for example, during a period T1 after a start of control in FIG. 7, when the vehicle brakes or turns, the instantaneous sportiness index Iin obtained by the variation in the acceleration increases or decreases; however, the instantaneous sportiness index Iin that is larger than the last local maximum value occurs before the above described predetermined condition is satisfied, so the command sportiness index Iout increases in a stepwise manner. In contrast, at t2 or t3, for example, when the vehicle shifts from acceleration during turning to acceleration during running straight ahead, the command sportiness index Iout decreases because a condition for decreasing the command sportiness index Iout is satisfied. In this way, in short, the condition for decreasing the command sportiness index Iout is satisfied if the command sportiness index Iout held at the last large value does not meet a driver's intention. In the embodiment of the invention, it is determined that the condition for decreasing the command sportiness index Iout is satisfied on the basis of a lapse of time.

That is, the situation that the command sportiness index Iout held at the last large value does not meet a driver's intention is that a deviation between the held command sportiness index Iout and the instantaneous sportiness index Iin generated during then is relatively large and this situation is continuing. Thus, the command sportiness index Iout is not decreased by the instantaneous sportiness index Iin caused by an operation that the driver temporarily returns the accelerator pedal 12 in the case where turning acceleration control is executed, or the like. On the other hand, the condition for decreasing the command sportiness index Iout is satisfied when it has been a predetermined period of time since the instantaneous sportiness index Iin, caused by an operation that the driver continuously returns the accelerator pedal 12 in the case where the vehicle gently decelerates, or the like, is lower than the command sportiness index Iout. In this way, the condition for decreasing the command sportiness index Iout may be a duration during which the instantaneous sportiness index Iin is lower than the command sportiness index Iout. In addition, in order to accurately incorporate an actual running condition into the command sportiness index Iout, it is applicable that the condition for decreasing the command sportiness index Iout is satisfied when a time integral value (or an accumulated value) of a deviation between the held command sportiness index Iout and the instantaneous sportiness index Iin reaches a predetermined threshold. Note that the threshold may be appropriately set by a driving test or simulation conducted in line with a driver's intention. When the latter time integral value of the deviation is used, the command sportiness index Iout is decreased in consideration of a period of time and a deviation between the command sportiness index Iout and the instantaneous sportiness index Iin, so control for changing the running characteristic into which an actual running condition or a behavior is further adequately incorporated is possible.

Note that, in the example shown in FIG. 7, a period of time during which the command sportiness index Iout is held up to t2 is longer than a period of time during which the command sportiness index Iout is held up to t3; however, this is because the following control is configured to be performed. That is, the command sportiness index Iout is increased and held at the last stage of the above described period T1 and, after that, the instantaneous sportiness index Iin increases at t1 before the above described condition for decreasing the command sportiness index Iout is satisfied, and then deviation between the held command sportiness index Iout and the instantaneous sportiness index Iin is lower than or equal to a predetermined value. Note that the predetermined value may be appropriately set by a driving test or simulation conducted in line with a driver's intention or in consideration of a calculation error of the instantaneous sportiness index Iin. In this way, the fact that the instantaneous sportiness index Iin is close to the held command sportiness index Iout means that the running condition at that time is placed in the accelerating/decelerating condition and/or turning condition that causes the instantaneous sportiness index Iin based on which the held command sportiness index Iout is determined or in a condition close to that. That is, even when a certain period of time has elapsed after the time at which the command sportiness index Iout is increased to the held value, the running condition is approximate to the running condition at the time before a lapse of the period of time. Therefore, even when the instantaneous sportiness index Iin is lower than the command sportiness index Iout, the duration for satisfying the above described condition for decreasing the command sportiness index Iout is extended so as to hold the last command sportiness index Iout. Control or process for extending the duration may be performed in such a manner that the above described integral value (accumulated value) of an elapsed time or integral value of the deviation is reset and then accumulation of an elapsed time or integration of the deviation is resumed, the accumulated value or integral value is reduced by a predetermined amount, or accumulation or integration is interrupted for a constant period of time, or the like.

Figure 8:
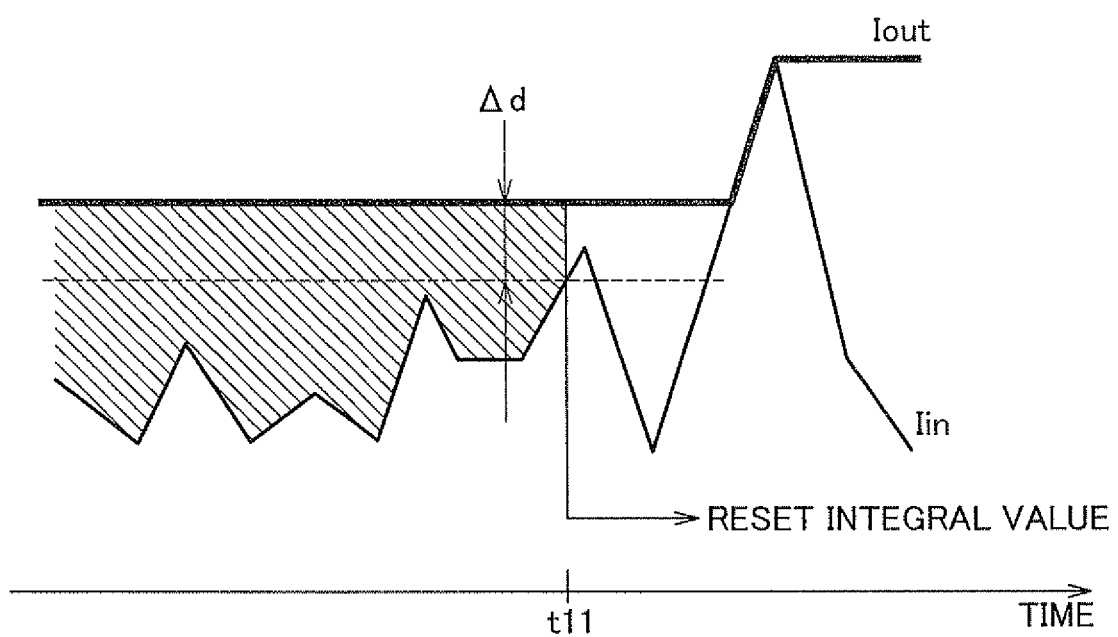
FIG. 8 is a graph for illustrating the time integral of a deviation between the instantaneous sportiness index and the command sportiness index and a situation in which the integral value is reset.

FIG. 8 is a schematic time chart of illustrating the above described integration of the deviation and the reset of the integral value. The hatched area in FIG. 8 corresponds to the integral value of the deviation. The integral value is reset at t11 at which a deviation between the instantaneous sportiness index Iin and the command sportiness index Iout is smaller than or equal to a predetermined value Δd and then integration of the deviation is started again. Thus, the condition for decreasing the command sportiness index Iout is not satisfied, so the command sportiness index Iout is kept at the last value. Then, after resuming integration, as the instantaneous sportiness index Iin becomes larger than the held command sportiness index Iout, the command sportiness index Iout is updated to the large value corresponding to the instantaneous sportiness index Tin, the updated command sportiness index Iout is held, and then the integral value is reset.

Incidentally, the control system according to the embodiment of the invention is configured to obtain an index on the basis of the acceleration and to set the running characteristic on the basis of the index. The acceleration may be a so-called actual acceleration obtained by a sensor; instead, the acceleration may be an estimated acceleration (or target acceleration) computed from a required driving amount, a vehicle speed, a braking operation amount, a steering angle, or the like. In addition, both an actual acceleration and a target acceleration may be used. When both an actual acceleration and a target acceleration are used, indices (a first index and a second index) are obtained in correspondence with the respective accelerations, those indices are compared with each other and then the index having a higher so-called sportiness index is employed. For example, a so-called actual instantaneous sportiness index Iin is obtained on the basis of an actual acceleration and an actual command sportiness index Iout is obtained on the basis of the actual instantaneous sportiness index Iin; whereas a so-called target instantaneous sportiness index Iin is obtained on the basis of a target acceleration and a target command sportiness index Iout is obtained on the basis of the target instantaneous sportiness index Iin. Then, the larger one of these actual command sportiness index Lout and target command sportiness index Iout is employed, and the running characteristic is set on the basis of the employed command sportiness index Iout.

The above described command sportiness index Iout is determined from the instantaneous sportiness index Iin calculated on the basis of the actual acceleration or the estimated acceleration. As described above, the command sportiness index Iout indicates the running condition of the vehicle, and includes information about a running environment, such as a road surface gradient, the presence or absence of a corner and the curvature of the corner, and a driver's driving orientation. This is because the acceleration of the vehicle varies depending on the condition of a running road and an accelerating/decelerating operation is conducted by the driver on the basis of the condition of the running road and then the acceleration varies in accordance with the accelerating/decelerating operation. The control system according to the embodiment of the invention is configured to utilize the command sportiness index Iout in control over various movements of the vehicle, including the running characteristic. Various movements of the vehicle, including the running characteristic, include an accelerating characteristic, a steering characteristic, a suspension characteristic, a sound characteristic, an optical characteristic, operating force for operating various operating devices, and the like. These characteristics may be appropriately set in such a manner that the above described control characteristic of the throttle valve 10, the shift characteristic of the transmission 13, the damping characteristic of the shock absorber 5 of each suspension device 4, the assist characteristic of the assist mechanism 18, a sound pressure and frequency generated by the sound generating device, and the like, are changed by the associated actuators.

Here, the command sportiness index Iout is an index that combines a longitudinal acceleration Gx and a lateral acceleration Gy. The command sportiness index Iout is increased as the resultant acceleration, that is, the instantaneous sportiness index Iin, increases. Thus, the running characteristic based on the command sportiness index Iout is basically able to achieve more sporty characteristic as the command sportiness index Iout increases.

As described above, the control system according to the embodiment of the invention is configured to incorporate the running condition of the vehicle into control over various movements of the vehicle, including the running characteristic of the vehicle. That is, various movements of the vehicle, including the running characteristic of the vehicle, are controlled on the basis of the command sportiness index Iout that is an index indicating the running condition of the vehicle. Then, the control system according to the embodiment of the invention is configured to control details output from the so-called effect producing device 29, such as a sound effect generating device, an audio device, a display device that displays light, image, or the like, and a pressure/vibration generating device that generates pressure or vibrations, on the basis of an index (parameter) calculated as described above, that is, a command sportiness index Iout, as described above. An example of the control is shown by the flowchart of FIG. 1. The routine shown in FIG. 1 is repeatedly executed by the ECU 28 at an interval of a predetermined short period of time. In addition, the routine is configured to be executed when a mode in which the vehicle runs with the running characteristic set on the basis of the above described command sportiness index Iout is selected by a driver or a mode selection switch is operated to select the mode. In the flowchart shown in FIG. 1, first, an index that indicates the running condition at that point in time is computed (step S1). The index is, for example, the above described instantaneous sportiness index Iin (or resultant acceleration, that is, resultant G). The index incorporates a driver's driving orientation, a road environment, such as a road gradient and a winding road, and the like, at that point in time. Then, a command sportiness index Iout that is data utilized when the running characteristic is changed is computed (step S2). Note that a method of computing these instantaneous sportiness index Iin and command sportiness index Iout is as described above.

Furthermore, the time differential value of the acceleration (that is, jerk) is computed (step S3). In the example described here, a resultant acceleration of the longitudinal acceleration Gx and the lateral acceleration Gy is used as data that indicate the running condition of the vehicle, so the time differential value of the resultant acceleration is employed as a jerk. The jerk J is expressed by the following mathematical expression (2). It is determined whether the thus computed jerk (that is, the differential value of Iin) is larger than a predetermined prohibiting determination threshold a (step S4). The prohibiting determination threshold α is a lower limit jerk at which it is not desirable that a variation in acceleration is superimposed on a variation in behavior caused by a change of the running characteristic, and is predetermined by a running test, a simulation, or the like. Then, one prohibiting determination threshold a may be set for the overall running characteristic. Different from this configuration, the prohibiting determination threshold α may be set one by one for the driving force characteristic, the shift characteristic, the steering characteristic, the suspension characteristic (damper characteristic), and the like, that are included in the running characteristic and that define the running characteristic. In this case, the prohibiting determination threshold α is relatively reduced for the characteristic of which a variation is easily experienced by a passenger of the vehicle. By so doing, a variation in characteristic of which a variation is easily experienced while the acceleration is varying is further strictly limited. Furthermore, the above prohibiting determination threshold a may be a constant value or may be a variable that varies on the basis of another factor, such as a vehicle speed.

$$J=\{(dGx/dt)^2+(dGy/dt)^2\}^{1/2} \quad (2)$$

When affirmative determination is made in step S4 because the jerk is larger than the above prohibiting determination threshold α, a flag F is set (step S5). That is, the flag F is set at "1". Subsequently, it is determined whether the jerk is smaller than an allowable determination threshold β (step S6). The allowable determination threshold β is used to evaluate a jerk when the jerk is decreased. More specifically, the allowable determination threshold β is used to determine whether the jerk is decreased to a degree to which a change of the running characteristic may be started. The allowable determination threshold β is used to determine the degree of jerk to which the behavior of the vehicle caused by a change of the running characteristic may be presumably superimposed on a variation in acceleration or to determine the control timing for changing the running characteristic so that a change of the running characteristic ends in a state where there is substantially no variation in acceleration. The allowable determination threshold β is predetermined by a running test, a simulation, or the like. Then, one allowable determination threshold β may be set for the overall running characteristic. Different from this configuration, the allowable determination threshold β may be set one by one for the driving force characteristic, the shift characteristic, the steering characteristic, the suspension characteristic (damper characteristic), and the like, that are included in the running characteristic and that define the running characteristic. In this case, the allowable determination threshold β is reduced for the characteristic of which a variation is easily experienced by a passenger of the vehicle. By so doing, a variation in characteristic of which a variation is easily experienced while the acceleration is varying is further strictly limited. Furthermore, the above allowable determination threshold β may be a constant value and may be, for example, a value close to zero. Instead, the allowable determination threshold β may be a value corresponding to a value (for example, maximum value) in the case where the jerk exceeds the above described prohibiting determination threshold α. Specifically, as the maximum value of the jerk increases, the allowable determination threshold β may be increased.

At the time or immediately after when the flag F is set at "1", the jerk is increased, so the jerk does not fall below the allowable determination threshold β and, therefore, negative determination is made in step S6. In this case, the routine shown in FIG. 1 once ends. That is, because the jerk exceeds the prohibiting determination threshold α, even when a large acceleration is applied and, as a result, the condition for changing the running characteristic is satisfied, a change of the running characteristic is prohibited.

On the other hand, when negative determination is made in step S4, that is, when the jerk is lower than or equal to the prohibiting determination threshold α, it is determined whether the flag F is "1" (step S7). The jerk is lower than or equal to the prohibiting determination threshold α both in the case where the jerk does not exceed the prohibiting determination threshold α even when the jerk is increased and in the case where the jerk falls at or below the prohibiting determination threshold α after the jerk exceeds the prohibiting determination threshold α. In the former case, that is, when the jerk does not exceed the prohibiting determination threshold α, the flag F is not set at "1", so negative determination is made in step S7. In this case, the jerk has not exceeded the prohibiting determination threshold α immediately before. In this case, a correction amount of effect producing characteristic determined on the basis of the above described command sportiness index Iout is computed (step S8), and then a predetermined produced effect is output from the effect producing device 29 on the basis of the corrected effect producing characteristic.

Here, the effect producing characteristic is a so-called output characteristic of a produced effect output by the effect producing device 29. Specifically, the effect producing characteristic not only includes characteristics associated with the behavior of the vehicle during running, such as a driving force characteristic, a shift characteristic, a steering characteristic and a suspension characteristic, but also control characteristics associated with the frequency or sound pressure of a sound effect output by the sound effect generating device, the color, the luminance, or display area of light displayed by the light display device, the magnitude of pressure/vibrations or the frequency of vibrations output by the pressure/vibration generating device, and the like. More specifically, the effect producing characteristic may be, for example, a sound (frequency, sound pressure, sound level) generation characteristic of an engine artificial sound when the intake/exhaust sound of the engine 8 is artificially reproduced and generated by the sound effect generating device, a light generation characteristic in which light (color, tone, luminosity, luminance), image or video displayed by the light display device is varied on the basis of a vehicle speed or an acceleration, or the like.

In addition, a correction amount of the effect producing characteristic based on the command sportiness index Iout is computed (the effect producing characteristic is corrected) on the basis of a command sportiness index Iout in itself, an accelerator operation amount, a steering angle (steering wheel angle), a vehicle speed (differentiation between during running at a low or intermediate speed and during running at a high speed), weather (differentiation between clear weather and rainy weather), brightness (differentiation between day and night), an outside air temperature, running road information obtained by a navigation system (running environment information about the type of a road, such as a suburban road and an expressway), running environment information, such as communication information through vehicle information and communication system (VICS), and the like.

An example of correcting the effect producing characteristic on the basis of an accelerator operation amount and a steering wheel angle will be described. For example, between when the vehicle is running on an urban road and when the vehicle is running on an expressway, there is found a difference in the tendency of variation in accelerator operation amount or steering wheel angle through a driver's operation. For example, when the vehicle is running on an urban road, the frequency at which the accelerator operation amount is fully increased or the steering wheel angle is rapidly increased by a large amount is low; whereas, when the vehicle is running on an expressway, the frequency at which the accelerator operation amount is fully increased or the steering wheel angle is rapidly increased by a large amount increases. Thus, by correcting the command sportiness index Iout, that is, the effect producing characteristic based on the command sportiness index Iout, on the basis of the accelerator operation amount or the steering wheel angle, it is possible to cause the effect producing device 29 to output a produced effect having an effect producing characteristic that further appropriately incorporates an actual driving condition or running environment or a driver's driving orientation.

Next, an example of correcting the effect producing characteristic on the basis of a vehicle speed will be described. A variation in acceleration is hard to occur when the vehicle is cruising at a high speed on an expressway, or the like, so the command sportiness index Iout may decrease. In such a case, the command sportiness index Iout, that is, the effect producing characteristic based on the command sportiness index Iout, is corrected on the basis of a vehicle speed. In addition, an example of correcting the effect producing characteristic on the basis of weather will be described. The running environment of the vehicle significantly varies between clear weather and rainy weather, so the driver's driving orientation, such as the degree of accelerating request and the degree of attention to a driving operation may also vary. Therefore, the command sportiness index Iout, that is, the effect producing characteristic based on the command sportiness index Iout, is corrected on the basis of a weather condition, specifically, for example, ON/OFF of a wiper for a windshield. In addition, the effect producing characteristic may be corrected on the basis of an outside brightness. The running environment of the vehicle significantly varies between day and night, so the driver's driving orientation, such as the degree of accelerating request and the degree of attention to a driving operation may also vary. Therefore, the command sportiness index Iout, that is, the effect producing characteristic based on the command sportiness index Iout, is corrected on the basis of an outside brightness, specifically, for example, a sensor value of an optical sensor or ON/OFF of a head lamp. In addition, the effect producing characteristic may be corrected on the basis of an outside air temperature. For example, the running environment of the vehicle significantly varies between when the temperature is high in the summer and when the temperature is low in the winter, so the driver's driving orientation, such as the degree of accelerating request and the degree of attention to a driving operation may also vary. Therefore, the command sportiness index Iout, that is, the effect producing characteristic based on the command sportiness index Iout, is corrected on the basis of an outside air temperature, specifically, for example, on the basis of whether the outside temperature is higher than a predetermined temperature determined as a temperature at or below which a road surface may freeze or a predetermined temperature that is determined as a temperature at or above which a thermal load on the engine 8 or a drivetrain increases. Furthermore, the effect producing characteristic may be corrected on the basis of information acquired through the navigation system or the vehicle information and communication system. For example, it may not be accurately determined only on the basis of the command sportiness index Iout whether a running road is an urban road, an expressway or a winding road in a mountain area or it may not be determined in real time only on the basis of the command sportiness index Iout whether traffic congestion is occurring on a running road, or the like. Therefore, the command sportiness index Iout, that is, the effect producing characteristic based on the command sportiness index Iout, is corrected on the basis of information acquired through the navigation system or the vehicle information and communication system.

In addition, the driving force characteristic of the vehicle is computed or corrected (step S9). In the case of a gasoline engine, the output torque of the engine 8 varies on the basis of a throttle opening degree, the fuel consumption varies depending on the engine rotational speed of the engine, and the engine rotational speed is controlled by the transmission 13. In step S9, the driving force characteristic for achieving a required maximum acceleration rate is obtained, and the driving force of the vehicle is controlled on the basis of the driving force characteristic. Specifically, the operation of the actuator for varying the opening degree of the throttle valve 10 of the engine 8 and the operation of the actuator for varying the shift characteristic of the transmission 13 are controlled on the basis of the driving force characteristic, that is, the command sportiness index Iout.

Furthermore, in step S9, other than the above described driving force characteristics, a control characteristic for controlling the actuator operated to vary the running characteristic, such as the damping characteristic of the shock absorber 5 of each suspension device 4 and the assist characteristic of the assist mechanism 18 of the steering wheel 16, may be computed or corrected. Then, the operations of various actuators for varying the running characteristic may be configured to be controlled on the basis of the control characteristic together with the driving force characteristic.

As described above, in step S9, the driving force characteristic included in the running characteristic is obtained on the basis of the command sportiness index Iout, and, when the driving force characteristic, that is, the running characteristic, is set, a flag F is reset to zero thereafter (step S10), after which the routine once ends.

Figure 2:
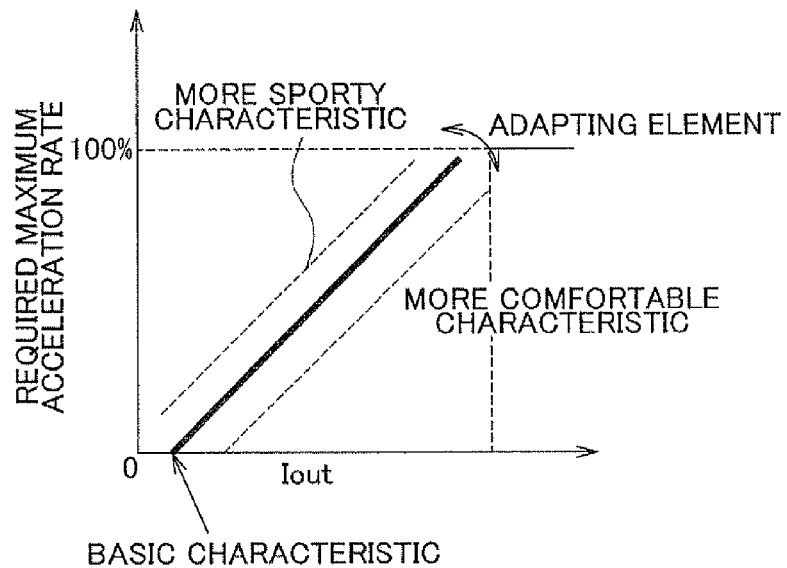
FIG. 2 is a map that shows the correlation between a command sportiness index and a required maximum acceleration rate.

The required maximum acceleration rate described above defines a margin driving force. For example, the required maximum acceleration rate 100% indicates a state where the potential maximum acceleration of the vehicle can be achieved, and means to set the transmission 13 at a speed ratio at which the engine rotational speed is maximal or the highest speed ratio (speed ratio at the lowermost vehicle speed side). In addition, for example, the required maximum acceleration rate 50% indicates a state where a half of the potential maximum acceleration of the vehicle can be achieved, and means to set the transmission 13 at an intermediate speed ratio. In the example shown in FIG. 2, as the command sportiness index Iout increases, the required maximum acceleration rate increases. The basic characteristic indicated by the solid line in FIG. 2 is obtained by calculating the correlation between a command sportiness index Iout and a required maximum acceleration rate on the basis of data acquired when the vehicle is actually caused to run, and includes appropriate corrections through actual vehicle running or a simulation. When a characteristic line is set on a side at which the required maximum acceleration rate is larger than that of the basic characteristic, the acceleration of the vehicle is relatively large, so the characteristic is a so-called sporty running characteristic or sporty accelerating characteristic. In contrast, when the characteristic line is set on a side at which the required maximum acceleration rate is smaller than that of the basic characteristic, the acceleration of the vehicle is relatively small, so the characteristic is a so-called comfortable running characteristic or comfortable accelerating characteristic. These adjustments (that is, adaptation or tuning) may be appropriately performed in accordance with salability required of the vehicle. Note that the reason why, in the basic characteristic, the required maximum acceleration rate becomes zero when the command sportiness index Iout is larger than zero is because a slight speed running condition, such as running in a traffic jam and putting the vehicle into a garage, is not incorporated into control for setting or changing the accelerating characteristic.

Figure 3:
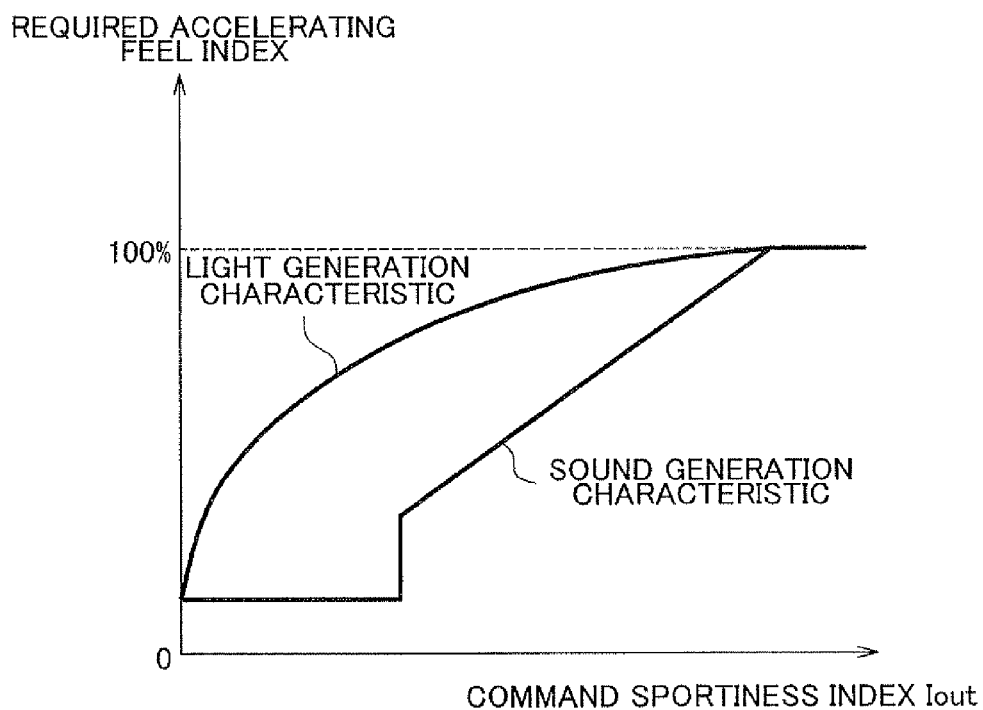
FIG. 3 is a graph that schematically shows the correlation among a command sportiness index, a required accelerating feel index and the output characteristic (sound generation characteristic, light generation characteristic) of an effect producing device (sound generating device, light display device)

Here, an example of correcting the effect producing characteristic on the basis of a command sportiness index Iout in itself will be described as an example of correcting the running characteristic on the basis of a command sportiness index Iout as described above. FIG. 3 is a graph that schematically shows the correlation between a required accelerating feel index, set on the basis of a command sportiness index Iout, and an effect producing characteristic. In FIG. 3, two examples, that is, a sound generation characteristic associated with sound and a light generation characteristic associated with light, are shown as the effect producing characteristic. In addition, the required accelerating feel index is an index that indicates a degree to which the above described required maximum acceleration rate is incorporated into driving force control. In the example shown in FIG. 3, a required accelerating feel index associated with the sound generation characteristic is set to a small value in a predetermined range in which the command sportiness index Iout is small, and increases with the command sportiness index Iout in a range in which the command sportiness index Iout is larger than or equal to a predetermined value. On the other hand, a required accelerating feel index associated with the light generation characteristic logarithmically increases with the command sportiness index Iout. This difference is due to the fact that the human sensibility tends to respond more sensitively to a variation in sound than to a variation in light. Thus, a variation in the sound generation characteristic is suppressed as compared with a variation in the light generation characteristic.

Figure 4:
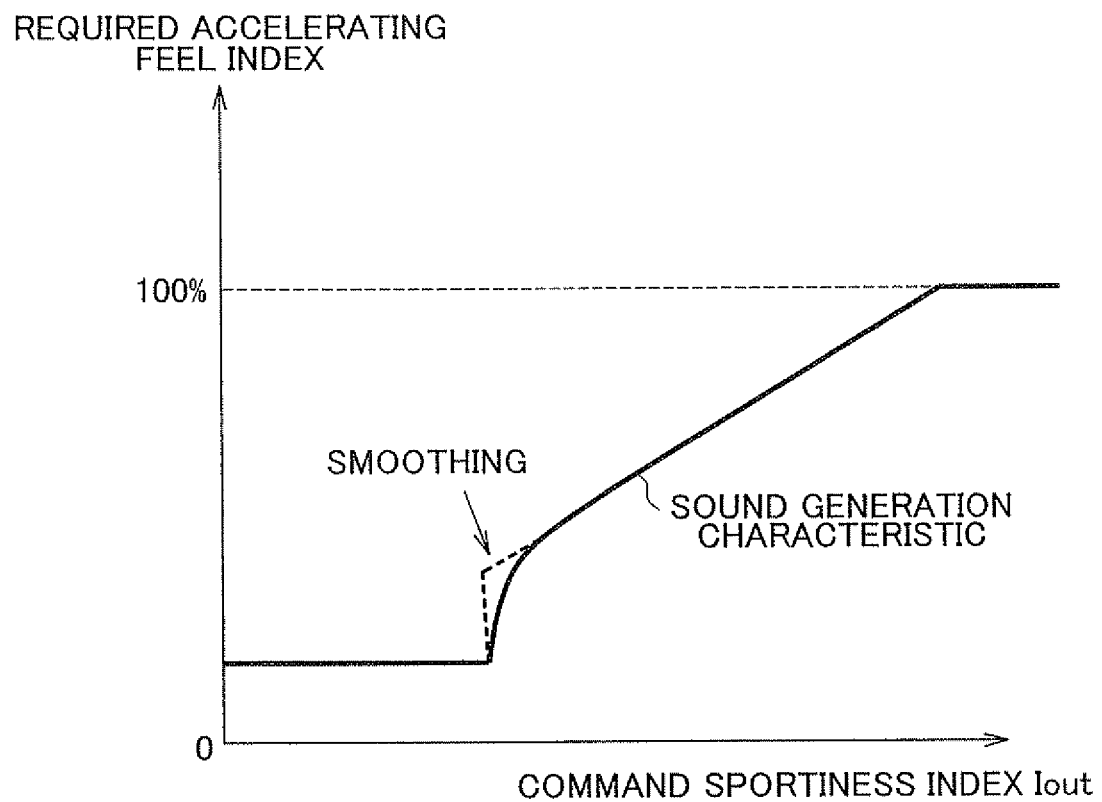
FIG. 4 is a graph that schematically shows the correlation among a command sportiness index, a required accelerating feel index and the output characteristic (sound generation characteristic) of the effect producing device (sound generating device), and is a view for illustrating the process of smoothing the sound generation characteristic.

In addition, focusing on the above described feature of the sound generation characteristic, the sound generation characteristic may be subjected to smoothing (or flattening). That is, in the example shown in FIG. 4, the sound generation characteristic that is subjected to smoothing is set so as to suppress or gently vary a variation in sound corresponding to a steep variation portion of a preset required accelerating feel index. In other words, in the configuration example shown in FIG. 4, particularly, a signal that controls a sound effect output from the sound effect generating device in the effect producing device 29 is subjected to smoothing so as to gently vary sound. Smoothing may use, for example, band-pass filtering that cuts a signal having a preset specific frequency band, first-order lag filtering, or the like, where appropriate. Furthermore, smoothing may also be applied to a produced effect output from the device of the effect producing device 29, other than the sound effect generating device, where appropriate. In such a case as well, smoothing that makes a sound effect output from the sound effect generating device smoother than the produced output from another device is applied to the sound effect generating device to thereby make it possible to suppress a steep increase in sound pressure, so it is possible to generate an appropriate sound effect.

Other specific examples of the effect producing device 29 and a device for varying the running characteristic according to the embodiment of the invention will be described. First, a specific example of the effect producing device 29 may include not only a sound generating device that outputs a sound effect, such as the above described artificial engine sound, alarm sound and voice announcement and a light display device that varies the color or tone of displayed light, the intensity, luminosity or luminance of light, the display area, display position or light-emitting time of displayed light but also, for example, a device that applies pressure to the seat of the vehicle or deforms part of the seat to vary the hardness of the seat or vary the seat hold characteristic, a device that varies the tension of the seat belt, a device that varies the position of the headrest or footrest of the seat, a device that discharges predetermined perfume to prompt a passenger's attention or to refresh the mood, or the like. The sound generating device may generate sound having a frequency corresponding to a vehicle speed.

In addition, an example of varying the running characteristic according to the embodiment of the invention may include not only a device that varies the output characteristic of the engine 8 or the shift characteristic of the transmission 13 as described above and a device that varies the steering characteristic of the steering wheel 16 or the suspension characteristic of each suspension device 4 but also, for example, a device that varies the strength or damping characteristic of a stabilizer, a device or means that controls driving force distribution between front and rear wheels or among all the four wheels in a four-wheel-drive vehicle, a device that varies the mount characteristic (for example, degree to which a component is fixed to a chassis at the mount portion) of a power train that includes the engine 8 and the transmission 13, or the like. In addition, the characteristic that is set or varied on the basis of the index may be the driving force characteristic. This is the characteristic of a throttle opening degree against a depression amount (that is, accelerator operation amount) of the accelerator pedal, and the running characteristic becomes a sporty feel as the correlation between an accelerator operation amount and a throttle opening degree approaches a one-to-one correlation. Furthermore, the characteristic of the power train may be the engagement characteristic of a lock-up clutch or the shift characteristic. The running characteristic becomes a sporty feel when these characteristics are set to increase driving force. Then, the audio characteristic may be the characteristic of intake/exhaust sound. When these sounds are brought close to the frequency or sound pressure of sound emitted by a racing car, the driver is given the impression that the vehicle is carrying out so-called sporty running.

As described above, with the control system according to the embodiment of the invention, a command sportiness index Iout that is an index for setting the running characteristic of a vehicle on the basis of the running condition of the vehicle is obtained. Then, for example, the operation of the actuator that varies the opening degree of the throttle valve 10 of the engine 8, the shift characteristic of the transmission 13, or the like, is controlled on the basis of the command sportiness index Iout. Furthermore, for example, details output from the effect producing device 29 that outputs a produced effect, such as sound, light, image, pressure and vibrations, are controlled on the basis of the command sportiness index Iout, as in the case of the above actuator. Thus, the operation of the actuator that varies the running characteristic of the vehicle and the details output from the effect producing device 29 that outputs the above described produced effect are controlled on the basis of the common index. Therefore, the running characteristic of the vehicle becomes the one expected or assumed by the driver to thereby make it possible to improve drivability. In addition, the effect producing device 29 may be controlled by appropriately incorporating a running condition, a running environment, driver's taste and habit, or the like, so it is possible to give comfort driving feeling and driving pleasure to the driver or to appropriately causing a passenger or a human outside the vehicle to pay attention.

Further, a control system according to another embodiment of the invention may be configured to vary details output from the effect producing device 29 on the basis of an index obtained from a resultant acceleration based on a longitudinal acceleration Gx and lateral acceleration Gy of the vehicle, such as the command sportiness index Iout.

What is claimed is:

1. A control system for a vehicle, comprising:
a controller that is configured to obtain an instantaneous index on the basis of an acceleration of the vehicle at an interval of each moment during running of the vehicle and a command index on a basis of the instantaneous index, to vary a running characteristic of the vehicle on the basis of the command index, and to vary details output from an effect producing device, which applies a stimulus to at least part of five senses of a driver of the vehicle, on the basis of the command index, wherein the controller is configured to:
hold the command index at a value corresponding to the instantaneous index;
increase the command index to a value corresponding to the instantaneous index when the instantaneous index exceeds a held command index;
decrease the command index when the instantaneous index falls below the held command index and a predetermined condition is satisfied; and
vary the running characteristic such that a quickness of a behavior of the vehicle increases as the command index increases.

2. The control system according to claim 1, wherein the vehicle includes at least any one of an accelerating operation mechanism, a decelerating operation mechanism and a steering mechanism, and
the controller is configured to vary a degree of variation in behavior resulting from operating the at least any one of the mechanisms, as the details output from the effect producing device, on the basis of the index.

3. The control system according to claim 1, wherein the vehicle includes at least any one of an accelerating operation mechanism, a decelerating operation mechanism and a steering mechanism, and
the controller is configured to vary reaction force against operating force when the driver operates the at least any one of the mechanisms, as the details output from the effect producing device, on the basis of the index.

4. The control system according to claim 1, wherein the effect producing device includes a sound generating device that generates sound, and
the controller is configured to vary a sound pressure of the sound generating device on the basis of the index.

5. The control system according to claim 4, wherein the sound generating device is configured to generate sound having a frequency corresponding to a speed of the vehicle.

6. The control system according to claim 4, wherein the controller is configured to execute smoothing such that a control signal for the sound generating device becomes smoother than a control signal for an actuator that varies the running characteristic.

7. The control system according to claim 1, wherein the index is obtained from a resultant acceleration based on a longitudinal acceleration and lateral acceleration of the vehicle.

8. A control system for a vehicle, comprising:
a controller that is configured to vary details output from an effect producing device, which applies a stimulus to at least part of five senses of a driver of the vehicle, on the basis of a command index that is obtained on the basis of an instantaneous index obtained from a resultant acceleration based on a longitudinal acceleration and lateral acceleration of the vehicle, wherein the controller is configured to:
hold the command index at a value corresponding to the instantaneous index;
increase the command index to a value corresponding to the instantaneous index when the instantaneous index exceeds a held command index;
decrease the command index when the instantaneous index falls below the held command index and a predetermined condition is satisfied; and
vary the running characteristic such that a quickness of a behavior of the vehicle increases as the command index increases.

* * * * *